United States Patent
Kölbl (10) Patent No.: US 11,913,527 B2
(45) Date of Patent: Feb. 27, 2024

(54) GEAR UNIT FOR A VEHICLE AND POWERTRAIN WITH SUCH A GEAR UNIT

(71) Applicant: ZF FRIEDRICHSHAFEN AG, Friedrichshafen (DE)

(72) Inventor: Thomas Kölbl, Ruderting (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/180,268

(22) Filed: Mar. 8, 2023

(65) Prior Publication Data
US 2023/0287964 A1    Sep. 14, 2023

(30) Foreign Application Priority Data
Mar. 10, 2022   (DE) ............... 10 2022 202 378.1

(51) Int. Cl.
*F16H 3/66*      (2006.01)
*B60K 1/00*      (2006.01)

(52) U.S. Cl.
CPC ............ *F16H 3/66* (2013.01); *B60K 1/00* (2013.01); *B60K 2001/001* (2013.01); *F16H 2200/2007* (2013.01)

(58) Field of Classification Search
CPC ........... F16H 3/66; F16H 2200/2097; F16H 2200/2005; F16H 2200/2007; F16H 37/0813; F16H 2048/104; F16H 2048/106; F16H 48/22; F16H 48/34; F16H 48/10; B60K 2001/001; F16D 13/52

See application file for complete search history.

(56) References Cited

U.S. PATENT DOCUMENTS 4,781,078 A * 11/1988 Blessing ............... F16H 48/22
                                                  475/252
5,217,416 A *  6/1993 Dick ..................... F16H 48/10
                                                  475/249

(Continued)

FOREIGN PATENT DOCUMENTS

DE         3915959      11/1990
DE        10329770       2/2005

(Continued)

OTHER PUBLICATIONS

Office Action dated Feb. 27, 2023 issued in German Patent Application No. 10 2022 202 378.1.

*Primary Examiner* — Stacey A Fluhart
(74) *Attorney, Agent, or Firm* — Cozen O'Connor (57) ABSTRACT

A gear unit has a differential that comprises two planetary gearsets, a first gearset element of the first planetary gearset is connected to an input shaft and a second gearset element of the first planetary gearset is connected to a first output shaft. A third gearset element of the second planetary gearset is connected to a second output shaft. A first output torque is transmittable to the first output shaft by the first planetary gearset. A reaction torque of the first planetary gearset is transmittable to the second output shaft. Between the first output shaft and second output shaft is an actuation mechanism having a first friction partner and a second friction partner. The friction partners generate a connection between the two output shafts when the actuation mechanism is actuated.

14 Claims, 3 Drawing Sheets

(56) References Cited

U.S. PATENT DOCUMENTS

| | | | | | |
|---|---|---|---|---|---|
| 5,906,558 | A | * | 5/1999 | Park | B60K 17/16 475/248 |
| 2005/0266955 | A1 | * | 12/2005 | Kushino | F16H 48/30 475/249 |
| 2021/0018069 | A1 | * | 1/2021 | Conlon | F16H 48/05 |

FOREIGN PATENT DOCUMENTS

| | | | | |
|---|---|---|---|---|
| DE | 102011085119 | | 2/2013 | |
| DE | 102013218502 | | 3/2015 | |
| DE | 102017212781 | | 1/2019 | |
| DE | 102018207110 A1 * | | 11/2019 | B60K 1/00 |
| DE | 102019205750 | | 10/2020 | |
| DE | 102019216510 | | 4/2021 | |
| DE | 102020200123 A1 * | | 7/2021 | |
| FR | 2540209 A1 * | | 1/1983 | B60K 1/00 |
| WO | WO-2005120877 A1 * | | 12/2005 | B60K 17/16 |
| WO | WO 2015/035995 | | 3/2015 | |
| WO | WO 2019/020280 | | 1/2019 | |

* cited by examiner

GEAR UNIT FOR A VEHICLE AND POWERTRAIN WITH SUCH A GEAR UNIT

BACKGROUND OF INVENTION

1. Field of the Invention

The disclosure is directed to a gear unit for a powertrain of a vehicle and to a powertrain with such a gear unit.

2, Description of Related Art

DE 10 2019 205 750 A1 discloses a gear unit comprising an input shaft, a first output shaft, a second output shaft, a first planetary gearset and a second planetary gearset connected to the first planetary gearset. The planetary gearsets comprise a plurality of elements in each instance, the input shaft, the two output shafts, the planetary gearsets, and elements thereof being arranged and formed in such a way that a torque introduced by the input shaft is converted and divided in a defined ratio between two output shafts. In so doing, the formation of a sum torque is prevented. At least one element of the first planetary gearset is connected to another element of the second planetary gearset so as to be fixed with respect to rotation relative to it, and a further element of the secondary planetary gearset is secured to a structural component that is fixed with respect to relative rotation.

It is known in differentials, for example, bevel gear differentials or spur gear differentials, to utilize preloaded bearing surfaces or sliding surfaces to generate a blocking effect. This is known, e.g., from DE 10 2011 085 119 B3.

SUMMARY OF THE INVENTION

An object of one aspect of the present invention is a gear unit for a powertrain with a blocking function. It is a further object of one aspect of the invention to provide a powertrain with such a gear unit.

A gear unit according to one aspect of the invention for a powertrain of a vehicle comprises an input shaft, a first output shaft, a second output shaft, and an integral differential which is operatively arranged between the input shaft and the two output shafts. The differential comprises a first planetary gearset with a plurality of gearset elements and a second planetary gearset with a plurality of gearset elements which is operatively connected to the first planetary gearset. A first gearset element of the first planetary gearset is connected to the input shaft so as to be fixed with respect to rotation relative to it, a second gearset element of the first planetary gearset is connected to the first output shaft so as to be fixed with respect to rotation relative to it, and a third gearset element of the first planetary gearset is connected to a first gearset element of the second planetary gearset so as to be fixed with respect to rotation relative to it. A second gearset element of the second planetary gearset is connected to a stationary structural component so as to be fixed with respect to rotation relative to it, and a third gearset element of the second planetary gearset is connected to the second output shaft so as to be fixed with respect to rotation relative to it. A first output torque is at least indirectly transmittable to the first output shaft by the first planetary gearset. A reaction torque of the first planetary gearset can be converted in the second planetary gearset in such a way that a second output torque corresponding to the first output torque is transmittable to the second output shaft. Operatively arranged between the first output shaft and second output shaft is an actuation mechanism comprising at least a first friction partner and a second friction partner, which is at least indirectly connectable to the first friction partner in frictional engagement. The friction partners are formed to generate a frictionally engaging connection between the two output shafts when the actuation mechanism is actuated.

In such a gear unit, the sums of both wheel torques are not unified or combined to form a common axle torque in a component part. Instead, the propulsion power introduced into the input shaft is divided in the integral differential and, corresponding to the construction and connection of the planetary gearsets, is conveyed to the output shafts which are operatively connected to the latter. Therefore, the component parts of the integral differential can be formed slimmer because of the comparatively small torque. Further, the quantity of component parts and weight are reduced. Consequently, a gear unit is provided in which, by the integral differential, the two functions of torque conversion and torque distribution as well as a blocking effect which were previously carried out by separate assemblies can be performed by an individual integral assembly. Accordingly, one aspect of the invention relates to a combined transmission/differential gear unit which realizes a torque conversion on the one hand and distributes torque to the output shafts on the other hand. In addition, a power splitting is realized.

Within the framework of one aspect of this invention, an integral differential is understood as a differential with a first planetary gearset and with a second planetary gearset that is operatively connected to the first planetary gearset. The first planetary gearset is drivingly connected to the input shaft, to the second planetary gearset and at least indirectly to the first output shaft. Further, the second planetary gearset is drivingly connected to the second output shaft and is supported at a stationary structural component. By an integral differential of this kind, the input torque at the input shaft can be converted and can be distributed or transmitted to the two output shafts in a defined ratio. Preferably, 50%, that is, one half, of the input torque is transmitted to each output shaft.

The input shaft, the two output shafts, the planetary gearsets and gearset elements thereof are arranged and formed in such a way that a torque introduced via the input shaft is converted in the differential and divided between the two output shafts in a defined ratio. Accordingly, the differential has no component part to which the sum of the two output torques is applied. In other words, a sum torque is prevented. Further, at identical output speeds of the output shafts, the differential has no direct-driving teeth or teeth revolving without rolling motion. Consequently, irrespective of the output speeds of the output shafts, there is always a relative movement of the component parts of the differential which are in meshing engagement with one another. The output shafts of the gear unit are configured in particular to be operatively connected to a wheel of the vehicle. The respective output shaft can be connected to the associated wheel directly or indirectly, that is, via a joint and/or a wheel hub, for example.

Consequently, the integral differential is constructed as a planetary gear unit with planetary gearsets and gearset elements comprising sun gear, ring gear and a plurality of planet gears guided by a planet carrier on an orbit around the sun gear.

By "planetary gearset" is meant a unit having a sun gear, a ring gear and one or more planet gears guided by a planet carrier on an orbit around the sun gear, the planet gears being in meshing engagement with the ring gear and the sun gear.

At least some of the gearset elements, preferably all of the gearset elements, of the planetary gearsets may be formed as spur gears or helical gears.

The input shaft is preferably adapted to be connected to a drive unit, particularly an electric machine or an internal combustion engine, for introducing a torque into the gear unit. The input shaft is accordingly connected at least indirectly to a driveshaft of the drive unit so as to be fixed with respect to rotation relative to it. The drive unit generates a propulsion power, which is transmitted to the input shaft via the driveshaft. The driveshaft of the drive unit can be connected to the input shaft so as to be fixed with respect to rotation relative to it. Alternatively, the driveshaft and the input shaft constitute a cohesive or integral component part. Depending on the construction of the powertrain, two or more input shafts can be provided, particularly when the powertrain is a hybridized powertrain and, therefore, two or more drive units are provided.

The input shaft is preferably formed as a hollow shaft. The input shaft is preferably adapted for radially receiving the first coupling shaft. In other words, the first coupling shaft is guided through the input shaft. Accordingly, the first coupling shaft is guided through the gear unit "in-line", so to speak, in order to transmit a propulsion power to the wheel that is operatively connected to it. Accordingly, the output shafts can advantageously be arranged coaxial to one another. As a result of the coaxial arrangement of the output shafts, a radially narrow construction of the gear unit can be realized.

A "shaft" is understood as a rotatable component part of the gear unit via which associated components of the gear unit are connected to one another so as to be fixed with respect to relative rotation. The respective shaft can connect the components axially or radially or both axially and radially. The term "shaft" does not apply exclusively, for example, to a cylindrical, rotatably supported machine element for transmitting torque. On the contrary, it can also refer to common connecting elements which connect individual component parts or elements to one another, in particular to connection elements which connect a plurality of elements to one another so as to be fixed with respect to relative rotation.

In principle, the planetary gearsets of the gear unit, in particular of the integral differential, may be arranged relative to one another and operatively connected to one another in any manner in order to realize a desired transmission ratio. According to an embodiment example, the first gearset element is a sun gear of the respective planetary gearset, the second gearset element is a planet carrier of the respective planetary gearset, and the third gearset element is a ring gear of the respective planetary gearset. The input shaft is accordingly connected to the sun gear of the first planetary gearset so as to be fixed with respect to rotation relative to it, the planet carrier of the first planetary gearset is connected to the first output shaft so as to be fixed with respect to rotation relative to it, and the ring gear at the planetary gearset is at least indirectly connected to the sun gear of the second planetary gearset so as to be fixed with respect to rotation relative to it. In particular, the ring gear of the first planetary gearset is connected via a coupling element, particularly a coupling shaft, to the sun gear of the second planetary gearset so as to be fixed with respect to rotation relative to it. According to one aspect of the invention, the planet carrier of the second planetary gearset is connected to a stationary component part, particularly a gear unit housing, so as to be fixed with respect to rotation relative to it, and the ring gear of the second planetary gearset is connected to the second output shaft so as to be fixed with respect to rotation relative to it.

Further, additional component parts, for example, intermediate shafts or coupling shafts, can be arranged between the above-mentioned component parts, i.e., the gearset elements of the planetary gearsets, analogous to the above-mentioned coupling shafts.

The first planetary gearset and second planetary gearset are preferably adjacently arranged in axial direction. In other words, the gearset elements of the first planetary gearset are arranged in a first common plane and the gearset elements of the second planetary gearset are arranged in a second common plane, the two planes extending substantially parallel and being arranged axially adjacent to one another. The respective common plane is oriented substantially perpendicular to the respective axle of the vehicle.

By "axial" is meant within the meaning of the invention an orientation in direction of a longitudinal central axis along which the planetary gearsets and the output shafts are arranged so as to extend coaxial to one another. By "radial" is meant an orientation in diameter direction of a shaft extending on this longitudinal central axis.

Alternatively, the first planetary gearset and second planetary gearset are arranged to be radially nested. A radially nested construction of the integral differential is realized in that the first planetary gearset according to the first aspect of the invention is arranged at least in some areas radially inside of the second planetary gearset. In other words, the gearset elements of the first planetary gearset and second planetary gearset are arranged axially in a common plane. Consequently, the first planetary gearset and second planetary gearset are arranged substantially in a common wheel plane, for which reason the gear unit may be designed to be axially short and therefore particularly compact. Accordingly, the first planetary gearset and second planetary gearset are arranged one above the other viewed radially.

One of the planetary gearsets or both of the planetary gearsets of the differential are preferably formed, respectively, as negative planetary gearset or as positive planetary gearset. A negative planetary gearset corresponds to a planetary gearset with a planet carrier on which first planet gears are rotatably mounted, and with a sun gear and a ring gear, the teeth of at least one of the planet gears meshing with the teeth of the sun gear and also with the teeth of the ring gear so that the ring gear and the sun gear rotate in opposite directions when the sun gear rotates with fixed carrier. A positive planetary gearset differs from the negative planetary gearset in that the positive planetary gearset has first and second, or inner and outer, planet gears, which are rotatably mounted on the planet carrier. The teeth of the first, or inner, planet gears mesh with the teeth of the sun gear on the one hand and with the teeth of the second, or outer, planet gears on the other hand. Further, the teeth of the outer planet gears mesh with the teeth of the ring gear. As a result, with the planet carrier being fixed, the ring gear and the sun gear rotate in the same direction.

When one or both planetary gearsets are formed as positive planetary gearset, the connection of the planet carrier and ring gear is switched and the amount of the stationary gear ratio is increased by one. In the same sense, the reverse is also possible if a negative planetary gearset is to be provided instead of a positive planetary gearset. The connection between the ring gear and the planet carrier would then be switched compared to the planetary gearset, and a stationary gear ratio would be reduced by one and the mathematical sign would change. However, the two planetary gearsets are preferably constructed as negative planetary gearsets within the framework of the invention. Negative planetary gearsets have a high degree of efficiency and can be arranged axially side by side or radially nested.

Alternatively, it is also conceivable to form one or both planetary gearsets as stepped planetary gearsets. Each stepped planet gear of the respective stepped planetary gearset preferably comprises a first toothed wheel with a second toothed wheel connected to it so as to be fixed with respect to relative rotation. The first toothed wheel is in meshing engagement, for example, with the sun gear, and the second toothed wheel is correspondingly in meshing engagement with the ring gear, or vice versa. These two toothed wheels may be connected to one another so as to be fixed with respect to relative rotation, for example, via an intermediate shaft or a hollow shaft. In case of the later, this hollow shaft can be rotatably mounted on a pin of the planet carrier. The two toothed wheels of the respective stepped planet gear preferably have different diameters and numbers of teeth in order to adjust a transmission ratio. Moreover, combined planetary gearsets are also contemplated.

In the present case, a gear unit is provided that can perform the functions of torque conversion, torque distribution and blocking effect between the output shafts through an individual integral subassembly. Accordingly, inter alia, a gear unit with an integral differential is provided that enables a blocking effect between the output shafts independent from torque and rotational speed. This can be achieved in both pull and push operation. In particular, the blocking effect is independent from an input torque of the gear unit, The blocking effect is controllable and adjustable via the actuation mechanism depending on the driving situation or operating situation. To this end, the actuation mechanism can communicate with a control unit in a suitable manner.

The blocking effect of the gear unit is achieved by a blocking torque which is generated by actuation of the actuation mechanism with resulting frictionally engaging connection between the output shafts. The blocking action is not dependent upon torque or speed; that is, it can be carried out at any time during operation of the motor vehicle. A "blocking value" is the quotient of the difference between the two output torques and the sum of the two output torques. A 100-% percent blocking effect means a co-rotationally locking, i.e., slip-free, connection between the output shafts. With a blocking effect of zero, there is no co-rotationally locking connection between the output shafts, that is, with a blocking effect of 0%, both wheels have exactly the same torque. With a blocking value of 100%, one output transmits 100% of the torque and the other transmits zero. The blocking effect can be adjusted between 0 and 100% depending on the contact pressing force of the friction partners, i.e., depending on an actual or desired driving maneuver.

The above-mentioned blocking function is realized by actuating or activating the actuation mechanism. The actuation mechanism can comprise an actuator or be an actuator which, when energized, controlled and/or adjusted in a corresponding manner, produces the frictionally engaging connection between the output shafts, in particular moves the friction partners at least indirectly axially and/or radially relative to one another in such a way that they come in frictional contact with one another for the frictionally engaging connection. The actuation of the actuation mechanism can comprise, for example, a permanent energizing of an actuator, particularly of an electric motor, until the blocking effect is to be deactivated again. Alternatively, a limited-time or temporary energizing can be carried out for actuating the actuation mechanism.

The first output shaft and second output shaft are actively couplable with one another via the friction partners. Depending on the construction of the actuation mechanism, one or both of the friction partners can be displaced relative to the other friction partner such that they come in frictional contact. Depending on pressing force, a blocking effect of between 0 and 100% is generated. In this connection, "actively" means that the torque-transmitting connection between the output shafts is carried out by controlling an actuator, or the like, which actuates or activates the actuation mechanism and presses the friction partners against one another.

The respective first friction partner is preferably at least indirectly connected to the first output shaft so as to be fixed with respect to rotation relative to it, and the respective second friction partner is at least indirectly connected to the second output shaft so as to be fixed with respect to rotation relative to it. Every two friction partners form a friction pair, a plurality of which can be provided in order to realize a compact actuation mechanism and/or to adjust a desired blocking torque with a comparatively small pressing force.

The third gearset element of the second planetary gearset is preferably at least indirectly connected via an intermediate shaft to the second output shaft so as to be fixed with respect to rotation relative to it. In particular, the second ring gear of the second planetary gearset is connected to the intermediate shaft so as to be fixed with respect to rotation relative to it. Accordingly, the intermediate shaft is arranged in the power flow between the third gearset element of the second planetary gearset, for example, the second ring gear of the second planetary gearset, and the second output shaft. Further, a flange can be arranged between the intermediate shaft and the second output shaft so as to be fixed with respect to relative rotation. The second ring gear of the second planetary gearset and the intermediate shaft can also be formed integrally.

The respective first friction partner is preferably at least indirectly axially displaceably connected to the first output shaft so as to be fixed with respect to rotation relative to it, the respective second friction partner being arranged at the second output shaft such that it is at least indirectly axially displaceable and so as to be fixed with respect to rotation relative to it. According to one aspect of the invention, the respective first friction partner is arranged at the first output shaft such that it is at least indirectly axially displaceable and fixed with respect to rotation relative to it, the respective second friction partner being arranged at the intermediate shaft so as to be at least indirectly axially displaceable and so as to be fixed with respect to rotation relative to it. In particular, the second friction element of the respective friction partner is arranged at a flange of the first output shaft so as to be axially displaceable and so as to be fixed with respect to rotation relative to it. According to one aspect of the invention, the friction partners are arranged radially between the intermediate shaft and the flange of the first output shaft.

One aspect of the invention includes the technical teaching that the actuation mechanism is a frictionally engaging clutch. Consequently, the force-fitting connection between the output shafts can be frictionally produced and therefore particularly depending upon a pressing force. The connection depends on a pressing force that is generated by the actuation mechanism. Accordingly, the axial forces of the helical teeth of the gearset elements are utilized for the pressing force. The friction partners preferably have complementary friction surfaces so that a connection can be produced by frictional force. The actuation mechanism preferably has at least two friction partners which can be brought into frictional engagement with one another, for example, in order to produce the blocking effect. The respective friction partner can also be formed directly on the second gearset element of the first planetary gearset which is connected to the first output shaft so as to be fixed with respect to rotation relative to it and/or on the third gearset element of the second planetary gearset which is connected to the second output shaft so as to be fixed with respect to rotation relative to it.

The actuation mechanism is preferably a multiplate clutch. The frictional force generated by the multiplate clutch is proportional to the axial force acting on the friction partners. Accordingly, the friction partners are formed as laminations, every two laminations forming a lamination pair which can enter into frictional engagement with one another. Further, a plurality of lamination pairs forms a lamination stack of alternately arranged first laminations and second laminations. The first laminations are connected at least indirectly to the first output shaft so as to be fixed with respect to rotation relative to it and second laminations are connected at least indirectly to the second output shaft so as to be fixed with respect to rotation relative to it. A multiplate clutch has the advantage over, e.g., a plain bearing, or the like, that a larger blocking torque can be produced between the two output shafts.

The actuation mechanism preferably has at least one actuation element formed to bring the friction partners into frictional contact with one another when actuated. The respective actuation element is displaceable particularly in axial direction in order to press the friction partners against one another axially with a pressing force to generate the frictional engagement. The respective actuation element may be pin-shaped or bolt-shaped. A plurality of such pins or bolts are arranged at or formed on a ring so as to be distributed along the circumference and can come in contact with one of the friction partners. In such a case, in a desired frictionally engaging connection between the output shafts, the ring is actuated in such a way that it brings the friction partners into frictional contact with one another and connects them in frictional engagement with one another. The ring preferably acts on one of the friction partners with the actuation elements, and the other friction partner—assuming only two friction partners are provided—can be arranged so as to be substantially axially fixed. In case of a multiplate clutch, the actuation element or the actuation elements act on the axially displaceable laminations and press them together to form a stack. With the exception of the axially outermost laminations, a first lamination at both front sides coming in frictional contact with a second lamination in each instance.

The friction surfaces of the friction partners are preferably formed planar or conical. A connection can be produced by friction force via the friction surfaces. This means that at least two corresponding friction surfaces are arranged between the two output shafts. Two friction surfaces form a torque-transmitting friction surface pair in each instance. The pressing force of the friction surfaces is caused by a pressing force generated by the actuation mechanism. The conical construction provides a higher friction torque with the number of friction surfaces remaining equal. A conical friction surface is formed at a friction cone, for example. A friction lamination can provide a planar friction surface, for example.

The actuation mechanism can be formed in any desired manner in principle. In every case, it is formed in such a way that, when it is actuated, the friction partners can be brought into frictional contact in order to generate a frictional engagement depending on pressing force. The actuation mechanism is preferably an electromechanical actuator or a hydraulic actuator.

A hydraulic actuator can comprise a cylinder-piston system. The piston, which is displaceable inside of the cylinder, limits a first working chamber and second working chamber. By alternately filling the first working chamber and the second working chamber with a fluid under pressure, for example, a hydraulic fluid, the piston which is operatively connected to one of the friction partners or to the respective actuation element can be displaced in axial and/or radial direction thus bringing the friction partners into frictional engagement with one another. It would also be conceivable to use a pneumatic actuator. In that case, the fluid is compressed air.

An electromechanical actuator can comprise an electric machine. An electric machine of this kind can comprise at least one co-rotationally fixed stator and a rotatably mounted rotor which is adapted to convert electrical energy into mechanical energy in the form of rotational speed and torque during motor operation and, if necessary, to convert mechanical energy into electrical energy in the form of current and voltage during generator operation. By energizing the electric machine, the respective actuation element which is formed as a pin, for example, can connect the friction partners at least indirectly in frictional engagement by corresponding displacement.

The electromechanical actuator preferably has a rotationally drivable first circular disk, which is arranged so as to be fixed with respect to axial displacement and a second circular disk, which is fixed with respect to relative rotation and arranged so as to be axially displaceable. At least one of the circular disks has at least one at least partially circumferential, ramp-shaped running path along which a respective rolling element arranged between the circular disks rolls when the first circular disk is rotated relative to the second circular disk in order to adjust a relative axial position of the circular disks depending on the rotational direction of the first circular disk. The first circular disk is formed to be operatively connected to a drive, particularly an electric motor. The drive carries out the rotational driving of the first circular disk. The rotational driving of the first circular disk can be carried out directly or via a gear step operatively arranged between the drive and the first circular disk.

The respective ramp-shaped running path can be arranged at one of the circular disks or at both circular disks. Accordingly, for each rolling element there is one running path at one of the circular disks or two opposing running paths on facing front sides of the circular disks. In case of two substantially opposed running paths, these running paths are preferably formed to run opposite one another. The more rolling elements are arranged so as to be distributed over the circumference between the circular disks, the more reliable the adjustment of an axial position of the second circular disk relative to the first circular disk. The rolling element or rolling elements are preferably balls, the running paths are corresponding ball races with a slope angle.

For example, an actuation of the actuation mechanism causes the second circular disk to be pressed away from the first circular disk by the rolling elements guided in the ramp-shaped running paths; in particular, the second circular disk comes in contact with the actuation element and presses it in direction of the friction partners. The friction partners are in turn pressed against one another by a pressing force depending on the rotational angle of the first circular disk and on the slope angle of the running paths.

In order to set the first circular disk in rotational motion, it preferably has an at least partially circumferentially extending toothing. Further, the toothing is preferably formed as an outer toothing. For example, the toothing is in meshing engagement with a pinion which is in turn connected integrally or in multiple parts with a rotor of the electric motor so as to be fixed with respect to rotation relative to it in every case.

The actuation mechanism preferably has a reset mechanism for at least indirectly restoring the friction partners to an initial position. The resetting of the respective friction partner can be carried out when the drive is deactivated or deenergized in order, for example, to displace the second circular disk back to its initial position relative to the first circular disk. This is accompanied by a disengagement of the frictional engagement between the friction partners. A functional reliability of the gear unit can be ensured by the reset mechanism.

The reset mechanism preferably has at least one return spring which is formed to move the second circular disk at least indirectly into its initial position relative to the first circular disk. The return spring can be preloaded during actuation of the actuation mechanism with the resulting pressing of the friction partners against one another, and the return spring relaxes again when, for example, the drive of the actuation mechanism is deactivated, in particular the electric motor is no longer energized. The respective return spring can be a helical spring, for example, which is arranged around the respective actuation element and is supported on one side at the respective actuation element and on the other side axially at the intermediate shaft, at the third gearset element of the second planetary gearset, at the flange of the second output shaft, or directly at the output shaft.

When the actuation mechanism is a hydraulic actuator, the reset mechanism can be omitted because the hydraulic actuator can actively generate and actively cancel a frictional engagement because of the two fillable working chambers.

For example, the second circular disk and/or the respective actuation element and/or one of the friction partners can be formed to interact with a sensor unit in order to acquire an axial position of the respective structural component part.

If an element is fixed, in particular to the stationary structural component, it is prevented from rotational movement. The structural component of the gear unit that is fixed with respect to relative rotation can preferably be a permanently stationary component, preferably a housing of the gear unit, a portion of such a housing or a structural component connected to the latter so as to be fixed with respect to rotation relative to it.

Within the framework of the invention, two structural components of the gear unit being "connected" or "coupled" or "communicating with one another" so as to be co-rotationally fixed means that these structural components are permanently coupled such that they cannot rotate independently from one another. Accordingly, an enduring rotational connection is meant. In particular, there is no switching element or shifting element provided between these structural components, which latter can be elements of the differential and/or also shafts and/or a co-rotationally fixed structural component of the gear unit. Rather, the corresponding structural components are fixedly coupled with one another. A torsionally elastic connection between two component parts also means that these components are fixed or co-rotationally fixed. In particular, a co-rotationally fixed connection can also include joints, e.g., in order to make possible a steering movement or a deflection of a wheel.

The term "operatively connected" means a non-shiftable connection between two component parts which is provided for a permanent transmission of a propulsion power, particularly a rotational speed and/or a torque. The connection can be made directly or via a fixed transmission. The connection can be carried out, for example, via a fixed shaft, gear teeth, particularly a spur gear toothing, and/or a belt mechanism.

By "at least indirectly" is meant that two component parts are (operatively) connected to one another via at least one further component part which is arranged between these two component parts or are directly and thus immediately connected to one another. Consequently, there can be arranged between shafts or toothed wheels further component parts which are operatively connected to the shaft or toothed wheel.

According to a second aspect of the invention, a powertrain according to the invention for a vehicle comprises a gear unit according to the previous constructions and a drive unit which is operatively connected to the gear unit. The drive unit is preferably an electric machine. The input shaft of the gear unit is a rotor of the electric machine or is connected to or coupled with the rotor or a rotor shaft so as to be fixed with respect to rotation relative to it. The rotor is rotatably mounted relative to a stator of the electric machine, this stator being fixed with respect to the housing. The electric machine is preferably connected to an accumulator which supplies the electric machine with electrical energy. Further, the electric machine is preferably controllable or adjustable by power electronics. Alternatively, the drive unit can also be an internal combustion engine. In this case, the input shaft is a crankshaft, for example, or is connected to or coupled with a crankshaft so as to be fixed with respect to rotation relative to it.

The drive unit is preferably arranged coaxial to the integral differential. Accordingly, an additional transmission from the input shaft to the rotor shaft or the rotor or crankshaft of the drive unit is not required.

The drive unit is preferably formed as an electric machine and is arranged coaxial to the input shaft, the first output shaft being guided through a rotor of the electric machine. Accordingly, the gear unit is particularly compact. Further, the first output shaft is guided through the input shaft.

Further intermediately connected components formed, for example, as planetary gear unit, spur gear unit, chain drive, belt drive, angle drive, articulated shaft, torsional damper, multispeed gearbox, or the like, may be arranged between the input shaft and the drive unit. Also, further intermediately connected components such as, for example, articulated shafts, step-up gear units, spring elements and damping elements, or the like, may be arranged between the respective output shaft and the wheel which is operatively connected thereto.

In particular, a step-up gear unit or a multispeed gear unit, preferably a two-speed transmission, can additionally be arranged upstream of the gear unit. This step-up gear unit or multispeed gear unit can then also be a component part of the gear unit and used to configure an additional multiplication in that, for example, the speed of the prime mover is stepped up and the input shaft is driven at this stepped-up speed. In particular, the multispeed gear unit or step-up gear unit can take the form of a planetary transmission.

The powertrain according to the type described above is utilizable in a vehicle. The vehicle is preferably a motor vehicle, in particular an automobile (e.g., a passenger vehicle with a weight of less than 3.5 t), bus or truck (bus and truck, e.g., with a weight of more than 3.5 t). In particular, the vehicle is an electric vehicle or a hybrid vehicle. The vehicle comprises at least two axles, one of the axles forming a drive axle which is drivable by the powertrain. The powertrain according to one aspect of the invention is operatively arranged at this driving axle. The powertrain transmits a propulsion power of the drive unit to the wheels of this axle via the gear unit according to one aspect of the invention. It is also conceivable for each axle to be provided with a powertrain of this type. The powertrain is preferably a front transverse type construction so that the input shaft and the output shafts are oriented substantially transverse to the longitudinal direction of the vehicle. Alternatively, the powertrain can be arranged diagonal to the longitudinal axis and transverse axis of the vehicle, in which case the output shafts are connected via corresponding joints to the wheels of the respective axle which are arranged transverse to the longitudinal axis of the vehicle.

The above definitions and statements relating to technical effects, advantages and advantageous embodiment forms of the inventive gear unit according to one aspect of the invention apply analogously to the inventive powertrain according to one aspect of the invention, and vice versa.

BRIEF DESCRIPTION OF THE DRAWINGS

The invention will be explained more fully in the following referring to the schematic drawings. The drawings show.

DETAILED DESCRIPTION OF THE PRESENTLY PREFERRED EMBODIMENTS

Figure 1:
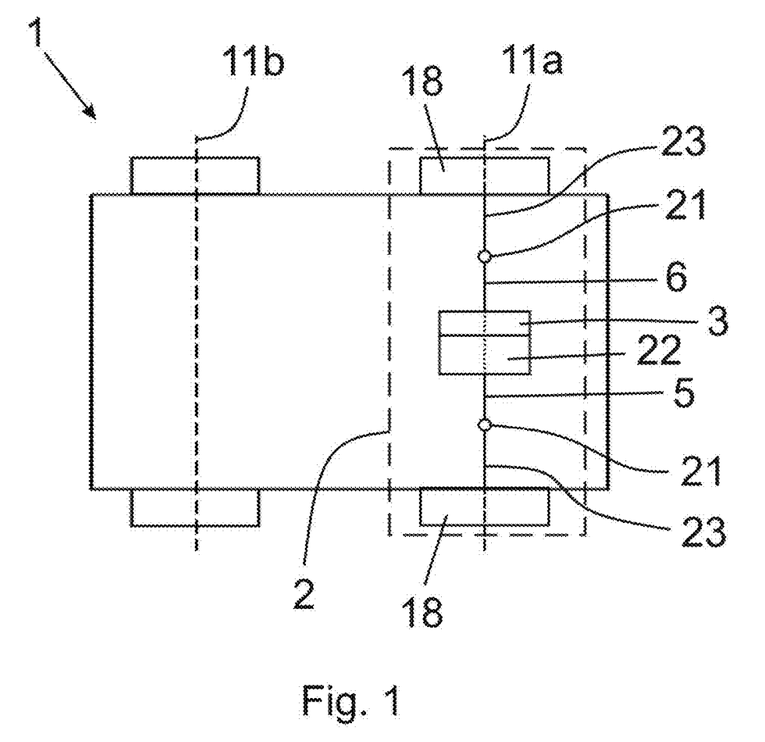
FIG. 1 is a highly schematic top view of a vehicle with a powertrain and a gear unit.
Figure 2:
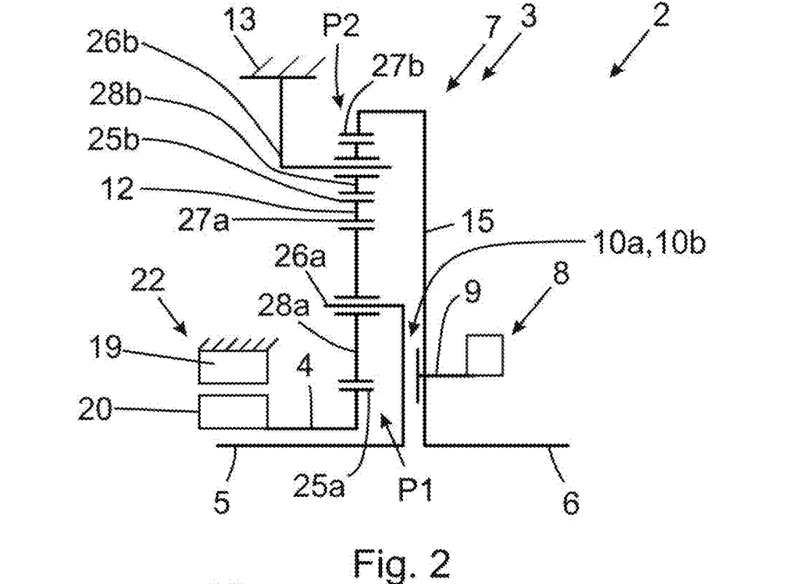
FIG. 2 is a highly schematic diagram of the gear unit from FIG. 1 with an actuation mechanism in the unactuated state.

FIG. 1 shows a vehicle 1 with two axles 11*a*, 11*b*. A powertrain 2 according to one aspect of the invention is drivingly arranged at the first axle 11*a*. The first axle 11*a* may be a front axle or rear axle of the vehicle 1 and forms a driven axle of the vehicle 1. Further, it is conceivable that the second axle 11*b* also has a powertrain 2 according to one aspect of the invention. The powertrain 2 comprises a drive unit 22 constructed as an electric machine and a gear unit 3, which is operatively connected to the latter. The construction and the arrangement of the powertrain 2 in the vehicle 1, in particular the gear unit 3, will be explained in more detail in the following figures. An exemplary drive unit 22 is shown in FIG. 1 and FIG. 2. This will be omitted in the following figures for the sake of simplicity. Only an input shaft 4 is shown, this input shaft 4 being drivingly connected to the drive unit 22 for transmitting a torque into the gear unit 3. The electric machine is supplied with electrical energy by an accumulator—not shown—which is operatively connected to a stator 19, shown in FIG. 2, which is fixed with respect to the housing. Further, the electric machine is connected to power electronics—not shown—for controlling and adjusting. By energizing the stator 19 of the electric machine, a rotor 20 which is arranged so as to be rotatable relative to the stator 19 and which is in turn connected as driveshaft to the input shaft 4 of the gear unit 3 so as to be fixed with respect to rotation relative to it is set in rotational motion relative to the stator 19. Alternatively, the input shaft 4 can also be connected to or coupled with a separate rotor shaft of the rotor 20 so as to be fixed with respect to rotation relative to it. Accordingly, the propulsion power of the drive unit 22 is guided via the input shaft 4 into the gear unit 3, where it is converted by an integral differential 7 and at least indirectly divided between a first output shaft 5 and a second output shaft 6. The drive unit 22 comprising the stator 19 and the rotor 20 is arranged coaxial to the integral differential 7.

The output shafts 5, 6, which are arranged coaxial to one another are indirectly connected in each instance to a wheel 18, shown in FIG. 1, of the first axle 11*a* in order to drive the vehicle 1. Joints 21 and wheel hubs 23 are arranged between the respective wheel 18 and the output shafts 5, 6 in order to compensate possible tilting of the output shafts 5, 6. Consequently, the vehicle 1 is an electric vehicle, and the drive is carried out fully electrically.

FIGS. 2 to 5 show a preferred embodiment of the gear unit 3 in two different states, which will be explained in the following. The respective gear unit 3 is a differential gear and in the present instance comprises the input shaft 4, a first output shaft 5 and a second output shaft 6. The output shafts 5, 6 are arranged coaxial to the integral differential 7 and extend in opposite directions toward the wheels 18 proceeding from the gear unit 3. In the present instance, the first output shaft 5 extends toward the left-hand side and the second output shaft 6 extends toward the right-hand side.

The integral differential 7 has a first planetary gearset P1 with a plurality of gearset elements and a second planetary gearset P2, which is operatively connected to the latter and which also has a plurality of gearset elements. In the present instance, at the first planetary gearset P1, the first gearset element is a first sun gear 25*a*, the second gearset element is a first planet carrier 26*a*, and the third gearset element is a first ring gear 27*a*. A plurality of first planet gears 28*a* in meshing engagement with the first sun gear 25*a* and the first ring gear 27*a* are rotatably arranged at the first planet carrier 26*a*. Further, at the second planetary gearset P2, the first gearset element is a second sun gear 25*a*, the second gearset element is a second planet carrier 26*b*, and the third gearset element is a second ring gear 27*b*. A plurality of second planet gears 28*b* in meshing engagement with the second sun gear 25*a* and the second ring gear 27*b* are rotatably arranged at the second planet carrier 26*b*.

The first planetary gearset P1 and the second planetary gearset P2 are formed, respectively, as negative planetary gearset, the first planetary gearset P1 being arranged radially inwardly of the second planetary gearset P2. Consequently, the integral differential 7 is constructed in a radially nested manner.

Figure 3:
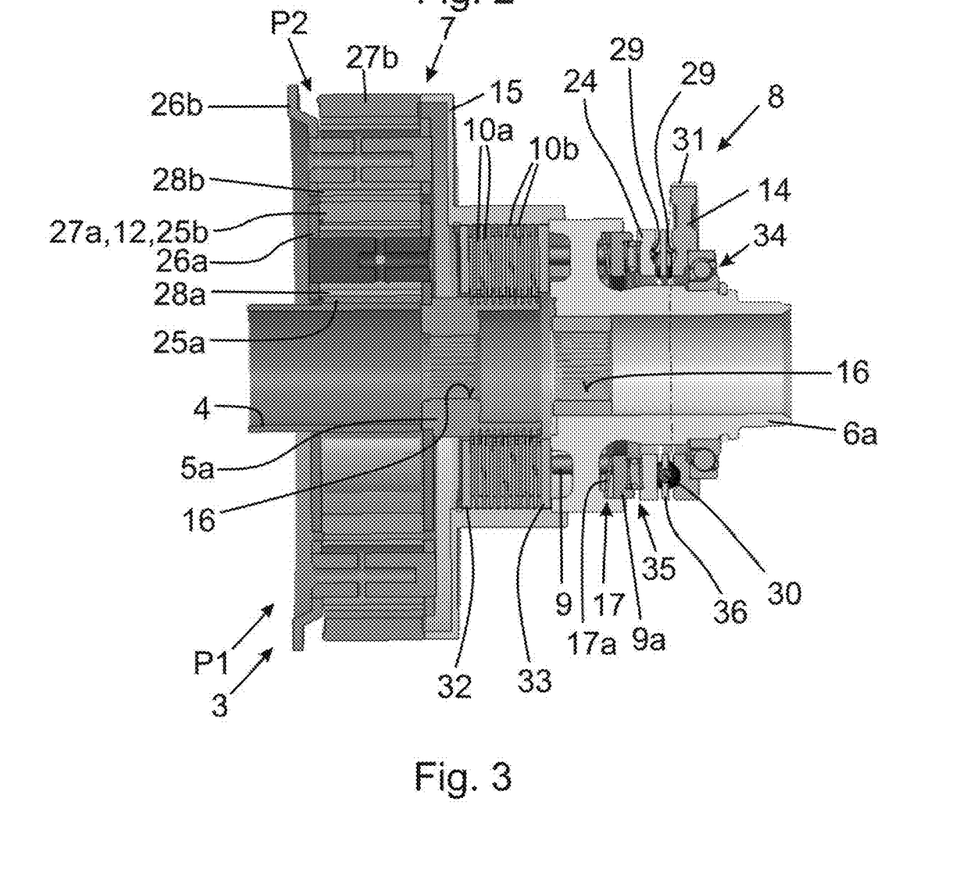
FIG. 3 is a schematic longitudinal section through the gear unit from FIG. 2 with the actuation mechanism in the unactuated state.
Figure 4:
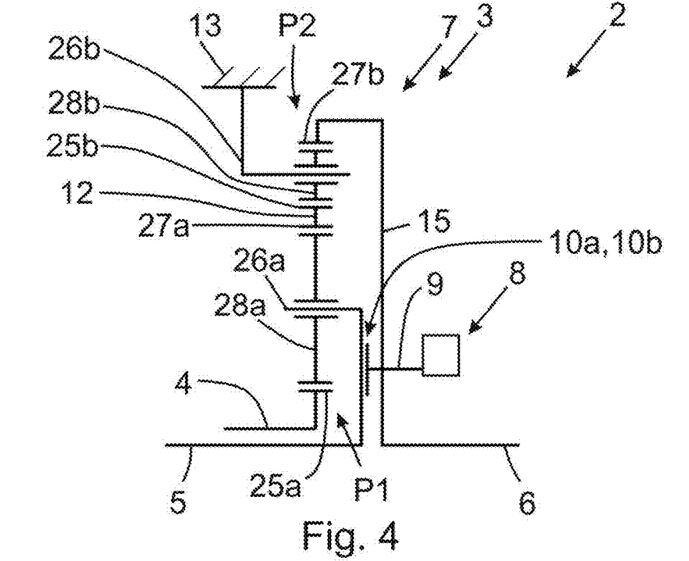
FIG. 4 is a highly schematic diagram of the gear unit according to FIG. 1 to FIG. 3 in the actuated state of the actuation mechanism.
Figure 5:
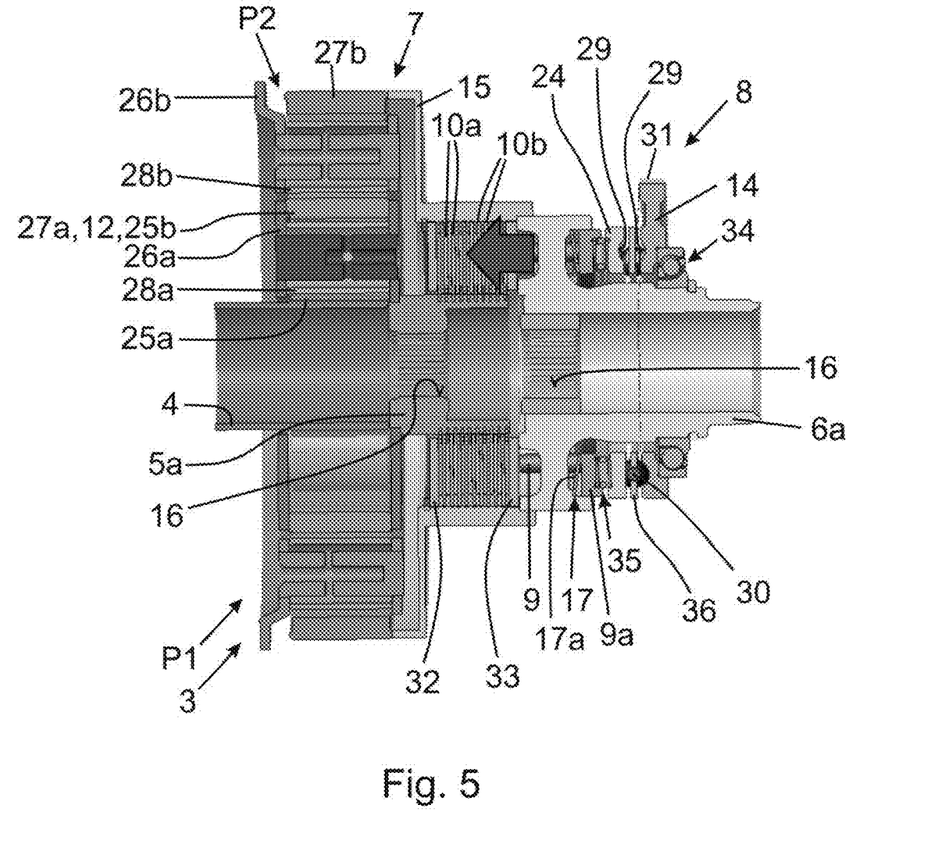
FIG. 5 is a schematic longitudinal section through the gear unit from FIG. 4 in the actuated state of the actuation mechanism.

The first sun gear 25*a* of the first planetary gearset P1 is connected to the input shaft 4 so as to be fixed with respect to rotation relative to it. The first planet carrier 26*a* of the first planetary gearset P1 is connected to a flange 5*a* of the first output shaft 5 so as to be fixed with respect to rotation relative to it. The first output shaft 5 is connected to the flange 5*a* so as to be fixed with respect to rotation relative to it and extends axially through the input shaft 4, the first sun gear 25*a* and the rotor 20 of the drive unit 22 according to FIG. 2. Consequently, the first sun gear 25a is formed as an inner hollow toothed wheel and the input shaft 4 which is connected to the latter so as to be fixed with respect to rotation relative to it is constructed as a hollow shaft. The first ring gear 27a of the first planetary gearset P1 is connected to the second sun gear 25a of the second planetary gearset P2 so as to be fixed with respect to rotation relative to it via a coupling shaft 12. Consequently, the second sun gear 25a and the first ring gear 27a are formed integrally or monolithically. The second planet carrier 26b of the second planetary gearset P2 is arranged so as to be fixed with respect to the housing and secured to a stationary structural component 13. The second ring gear 27b of the second planetary gearset P2 is connected to the second output shaft 6 so as to be fixed with respect to rotation relative to it via an intermediate shaft 15 and a flange 6a. The output shafts 5, 6 are not shown in FIG. 3 and FIG. 5 but only in FIG. 1, FIG. 2 and FIG. 4. Only flanges 5a, 6a which are connected to the respective output shaft 5, 6 via an inner toothing 16 so as to be fixed with respect to relative rotation are shown in FIG. 3 and FIG. 5.

A first output torque is transmittable to the first output shaft 5 by the first planetary gearset P1. A reaction torque of the first planetary gearset P1 is transformable in the second planetary gearset P2 such that a second output torque corresponding to the first output torque is transmittable to the second output shaft 6.

In a pull operation of the powertrain 2, the power flow runs from the input shaft 4 at which the propulsion power of the drive unit 22 is introduced into the gear unit 3 to the two output shafts 5, 6 via the planetary gearsets P1, P2 of the integral differential 7. In a push operation of the powertrain 2, the power flow runs in the reverse direction from the respective output shaft 5, 6 via the planetary gearsets P1, P2 of the integral differential 7 to the input shaft 4, where the propulsion power is introduced into the drive unit 22. In push operation, the drive unit 22 can be operated in generator mode for generating electrical energy.

An actuation mechanism 8 formed as a frictionally engaging clutch is arranged between the first output shaft 5 and the second output shaft 6. In the present instance, the actuation mechanism is a multiplate clutch. The actuation mechanism 8 has a plurality of first friction partners 10a formed as first laminations and a plurality of second friction partners 10b formed as second laminations, the first friction partners 10a and second friction partners 10b being alternately arranged in axial direction. The friction partners 10a, 10b form a lamination stack, the friction partners 10a, 10b being arranged axially between a first supporting element 32 which is arranged at the intermediate shaft 15 so as to be fixed with respect to rotation relative to it and axially fixed and a second supporting element 33 which is arranged at the intermediate shaft 15 so as to be fixed with respect to rotation relative to it and axially displaceable. The first friction partners 10a are arranged at the flange 5a of the first output shaft 5 so as to be axially displaceable and so as to be fixed with respect to rotation relative to it, and the second friction partners 10b are arranged at the intermediate shaft 15 so as to be axially displaceable and so as to be fixed with respect to rotation relative to it. The friction surfaces of the friction partners 10a, 10b are formed to be planar in the present instance. A conical construction of the friction surfaces is also conceivable.

In the present instance, the actuation mechanism 8 is an electromechanical actuator comprising a plurality of pin-shaped actuation elements 9 which are distributed along the circumference and which are arranged at a common ring 9a and extend substantially axially, i.e., substantially axially parallel to the axle 11a. The actuation elements 9 come in contact axially at the second supporting element 33. By actuating the actuation elements 9, the lamination-shaped friction partners 10a, 10b are pressed together and accordingly come in frictional contact with one another in order to generate a frictionally engaging connection between the two output shafts 5, 6.

The actuation mechanism 8 formed as electromechanical actuator further comprises a rotationally drivable first circular disk 14 which is arranged so as to be fixed with respect to axial displacement and a second circular disk 24 arranged to be fixed with respect to relative rotation and so as to be axially displaceable. The first circular disk 14 has a toothing 31 along part of the circumference formed to meshingly engage with a pinion—not shown here—of an electric motor. The rotatable support of the first circular disk 14 relative to the flange 6a of the second output shaft 6 is carried out via a bearing element 34.

A plurality of rolling elements 30 arranged in a cage 36 are guided in respective ramp-shaped running paths 29 axially between the circular disks 14, 24. Every spherical rolling element 30 is guided in a running path 29 at the first circular disk 14 and in an opposed running path 29 at the second circular disk 24. The angles of slope of the opposing running paths 29 are formed in an oppositely running manner, not shown, in order to realize a relatively large axial actuating path of the second circular disk 24—in this case, toward the left-hand side in arrow direction referring to FIG. 5—with a comparatively minimal twisting of the first circular disk 14. That is, depending on the direction of rotation of the first circular disk 14, a relative axial position of the second circular disk 24 relative to the first circular disk 14 is adjusted at which the friction partners can be pressed against one another to generate a frictional force.

There is provided a reset mechanism 17 which, for example, when the electric motor is deenergized, realizes a resetting of the second circular disk 24 to its initial position. In other words, the reset mechanism 17 causes the second circular disk 24 to be moved toward the right-hand side in direction of the first circular disk 14. At the same time, the frictional contact between friction partners 10a, 10b is disengaged and the frictional engagement is deactivated. To this end, the reset mechanism 17 has as many return springs 17a as actuation elements 9, the actuation elements 9 being guided through the helical return springs 17a. The return springs 17a are axially supported at the ring 9a on one side and at the flange 6a of second output shaft 6 on the other side. A thrust bearing 35 is arranged axially between ring 9a and the second circular disk 24 in order to enable a rotation of the flange 6a together with the ring 9a relative to the second circular disk 24.

It is explicitly noted that the association of the gearset elements with the elements of the respective planetary gearset P1, P2 can be switched in any desired manner. The respective connection of the gearset elements comprising sun gear, planet carrier and ring gear is carried out depending on the requirements for the transmission ratios, including mathematical signs. Instead of a negative planetary gearset, the respective planetary gearset P1, P2 can also always be a positive planetary gearset by switching the connection of planet carrier and ring gear and increasing the amount of the stationary gear ratio by one. The reverse is also possible in an analogous manner.

Further, it is conceivable for an additional step-up gear unit, which is not shown and which is formed, for example, as a planetary transmission with one or more planetary gearsets, to be arranged between the drive unit 22 and the gear unit 3 in order to increase the overall transmission ratio of the drive.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A gear unit for a powertrain of a vehicle, comprising:
   an input shaft;
   a first output shaft;
   a second output shaft and an integral differential operatively arranged between the input shaft and the two output shafts;
   wherein the integral differential comprises:
      a first planetary gearset with a plurality of gearset elements; and
      a second planetary gearset with a plurality of gearset elements which is operatively connected to the first planetary gearset,
   wherein:
      a first gearset element of the first planetary gearset is connected to the input shaft to be fixed with respect to rotation relative to it;
      a second gearset element of the first planetary gearset is connected to the first output shaft to be fixed with respect to rotation relative to it;
      a third gearset element of the first planetary gearset is connected to a first gearset element of the second planetary gearset to be fixed with respect to rotation relative to it;
      a second gearset element of the second planetary gearset is connected to a stationary structural component to be fixed with respect to rotation relative to it; and
      a third gearset element of the second planetary gearset is connected to the second output shaft to be fixed with respect to rotation relative to it;
      a first output torque is at least indirectly transmittable to the first output shaft by the first planetary gearset;
      a reaction torque of the first planetary gearset is convertible in the second planetary gearset such that a second output torque corresponding to the first output torque is transmittable to the second output shaft;
   an actuation mechanism is operatively arranged between the first output shaft and second output shaft comprising:
      at least a first friction partner;
      a second friction partner at least indirectly connectable to the first friction partner in a frictional engagement, and
      an actuation element formed to bring the first friction partner and the second friction partner into frictional contact with one another when actuated,
   wherein the first friction partner and the second friction partner are configured to generate a frictionally engaging connection between the first output shaft and the second output shaft when the actuation mechanism is actuated,
   wherein the third gearset element of the second planetary gearset is at least indirectly connected via an intermediate shaft and a flange to the second output shaft to be fixed with respect to rotation relative to it,
   wherein the second friction partner is arranged at the intermediate shaft to be at least indirectly axially displaceable and so as to be fixed with respect to rotation relative to it,
   wherein the actuation element of the actuation mechanism is guided at the flange.

2. The gear unit according to claim 1, wherein:
   the first friction partner is at least indirectly axially displaceably connected to the first output shaft to be fixed with respect to rotation relative to it.

3. The gear unit according to claim 1, wherein the actuation mechanism is a frictionally engaging clutch.

4. The gear unit according to claim 3, wherein the actuation mechanism is a multiplate clutch.

5. The gear unit according to claim 1, wherein the actuation mechanism has at least one actuation element configured to bring the first friction partner and the second friction partner into frictional contact with one another when actuated.

6. The gear unit according to claim 1, wherein respective friction surfaces of the first friction partner and the second friction partner are planar or conical.

7. The gear unit according to claim 1, wherein the actuation mechanism is an electromechanical actuator or a hydraulic actuator.

8. The gear unit according to claim 7, wherein actuation mechanism is an electromechanical actuator and the electromechanical actuator comprises:
   a rotationally drivable first circular disk arranged to be fixed with respect to axial displacement; and
   a second circular disk which is fixed with respect to relative rotation and arranged to be axially displaceable,
   wherein at least one of the first circular disk and the second circular disk has at least one at least partially circumferential, ramp-shaped running path along which a respective rolling element arranged between the first and second circular disks rolls when the first circular disk is rotated relative to the second circular disk to adjust a relative axial position of the first and second circular disks depending on a rotational direction of the first circular disk.

9. The gear unit according to claim 8, wherein the first circular disk has an at least partially circumferentially extending toothing.

10. The gear unit according to claim 8, wherein the actuation mechanism has a reset mechanism configured to at least indirectly restoring the first and second friction partners to an initial position.

11. The gear unit according to claim 10, wherein the reset mechanism has at least one return spring configured to move the second circular disk at least indirectly into its initial position relative to the first circular disk.

12. A powertrain for a vehicle, comprising:
    at least one gear unit, comprising:
       an input shaft;
       a first output shaft;

a second output shaft and an integral differential operatively arranged between the input shaft and the two output shafts;
wherein the integral differential comprises:
a first planetary gearset with a plurality of gearset elements; and
a second planetary gearset with a plurality of gearset elements which is operatively connected to the first planetary gearset,
wherein:
a first gearset element of the first planetary gearset is connected to the input shaft to be fixed with respect to rotation relative to it;
a second gearset element of the first planetary gearset is connected to the first output shaft to be fixed with respect to rotation relative to it;
a third gearset element of the first planetary gearset is connected to a first gearset element of the second planetary gearset to be fixed with respect to rotation relative to it;
a second gearset element of the second planetary gearset is connected to a stationary structural component to be fixed with respect to rotation relative to it; and
a third gearset element of the second planetary gearset is connected to the second output shaft to be fixed with respect to rotation relative to it;
a first output torque is at least indirectly transmittable to the first output shaft by the first planetary gearset;
a reaction torque of the first planetary gearset is convertible in the second planetary gearset such that a second output torque corresponding to the first output torque is transmittable to the second output shaft;
an actuation mechanism is operatively arranged between the first output shaft and second output shaft comprising:
at least a first friction partner;
a second friction partner at least indirectly connectable to the first friction partner in a frictional engagement, and
an actuation element formed to bring the first friction partner and the second friction partner into frictional contact with one another when actuated,
wherein the first friction partner and the second friction partner are configured to generate a frictionally engaging connection between the first output shaft and the second output shaft when the actuation mechanism is actuated; and
a drive unit which is operatively connected to the at least one gear unit,
wherein the third gearset element of the second planetary gearset is at least indirectly connected via an intermediate shaft and a flange to the second output shaft to be fixed with respect to rotation relative to it, and
wherein the second friction partner is arranged at the intermediate shaft to be at least indirectly axially displaceable and so as to be fixed with respect to rotation relative to it,
wherein the actuation element of the actuation mechanism is guided at the flange.

13. The powertrain according to claim 12, wherein the drive unit is arranged coaxial to the integral differential.

14. The powertrain according to claim 13, wherein the drive unit is an electric machine and is arranged coaxial to the input shaft, wherein the first output shaft is guided through a rotor of the electric machine.

* * * * *